US012309025B2

(12) United States Patent
Wince et al.

(10) Patent No.: US 12,309,025 B2
(45) Date of Patent: May 20, 2025

(54) SYSTEM AND METHOD FOR CONFIGURING AN ADAPTIVE COMPUTING CLUSTER

(71) Applicant: DrFirst.com. Inc., Rockville, MD (US)

(72) Inventors: Ronnie Wince, Mesa, AZ (US); Tyler Wince, Mesa, AZ (US)

(73) Assignee: DrFirst.com, Inc., Rockville, MD (US)

( * ) Notice: Subject to any disclaimer, the term of this patent is extended or adjusted under 35 U.S.C. 154(b) by 0 days.

(21) Appl. No.: 18/426,081

(22) Filed: Jan. 29, 2024

(65) Prior Publication Data

US 2024/0171459 A1 May 23, 2024

Related U.S. Application Data

(63) Continuation of application No. 17/973,210, filed on Oct. 25, 2022, now Pat. No. 11,888,689, which is a
(Continued)

(51) Int. Cl.
*H04L 41/0816* (2022.01)
*G06F 9/445* (2018.01)
(Continued)

(52) U.S. Cl.
CPC .......... *H04L 41/0816* (2013.01); *G06F 9/445* (2013.01); *G06F 9/44505* (2013.01);
(Continued)

(58) Field of Classification Search
CPC . H04L 41/0816; H04L 41/0233; H04L 41/16; H04L 67/10; H04L 41/0895;
(Continued)

(56) References Cited

U.S. PATENT DOCUMENTS 10,108,812 B2 * 10/2018 Ansari ................... G06Q 10/06
2004/0107203 A1 * 6/2004 Burdick .............. G06F 16/2365
(Continued)

OTHER PUBLICATIONS

Pahl C. et al., "Containers and Clusters for Edge Cloud Architectures—a Technology Review", (Sep. 16, 2015), URL: http://doras.dcu.ie/20641/1/FICloud15-EdgeCloudContainer.pdf, (Jan. 24, 2019), XP032798312.

*Primary Examiner* — David R Lazaro
*Assistant Examiner* — Mariegeorges A Henry
(74) *Attorney, Agent, or Firm* — Booth Udall Fuller, PLC; Kenneth C. Booth

(57) ABSTRACT

A system for configuring an adaptive computer cluster is disclosed. The system includes a cluster configuration server communicatively coupled to a cluster hosting environment through a network, the cluster configuration server having a processor and a memory. The memory includes a plurality of inert containers and a configuration tool configured to receive at least one procedure having a trigger event and at least one task and further configured to instruct the cluster hosting environment to instantiate the adaptive computer cluster based upon the at least one procedure and using the plurality of inert containers. The instantiation instructions include instructions to instantiate, within the cluster hosting environment, an API gateway container, a storage container, a distributed computing master node container, at least one solution-specific container, and an orchestrator container. The instructions from the configuration tool further include instructions to communicatively couple all of the containers to the orchestrator container.

20 Claims, 11 Drawing Sheets

Related U.S. Application Data continuation of application No. 16/175,633, filed on Oct. 30, 2018, now Pat. No. 11,483,201.

(60) Provisional application No. 62/579,649, filed on Oct. 31, 2017.

(51) Int. Cl.
| | | |
|---|---|---|
| *G06F 9/48* | (2006.01) | |
| *G06F 9/54* | (2006.01) | |
| *G06F 16/215* | (2019.01) | |
| *G06N 20/00* | (2019.01) | |
| *H04L 41/0233* | (2022.01) | |
| *H04L 41/16* | (2022.01) | |
| *H04L 67/10* | (2022.01) | |

(52) U.S. Cl.
CPC ............ *G06F 9/4881* (2013.01); *G06F 9/542* (2013.01); *G06F 16/215* (2019.01); *G06N 20/00* (2019.01); *H04L 41/0233* (2013.01); *H04L 41/16* (2013.01); *H04L 67/10* (2013.01)

(58) Field of Classification Search
CPC ..... H04L 41/40; G06F 9/445; G06F 9/44505; G06F 9/4881; G06F 9/542; G06F 16/215; G06N 20/00; G06N 5/01; G06N 20/20
See application file for complete search history.

(56) References Cited

U.S. PATENT DOCUMENTS

| | | |
|---|---|---|
| 2005/0262194 A1 | 11/2005 | Mamou |
| 2013/0144649 A1 | 6/2013 | Kalies, Jr. |
| 2013/0326507 A1 | 12/2013 | McGrath |
| 2016/0124742 A1* | 5/2016 | Rangasamy ........ H04L 41/0803 717/103 |
| 2017/0063722 A1* | 3/2017 | Cropper ................. G06F 16/285 |
| 2019/0043487 A1* | 2/2019 | Rivkin .................... G06F 40/20 |

* cited by examiner

SYSTEM AND METHOD FOR CONFIGURING AN ADAPTIVE COMPUTING CLUSTER

RELATED APPLICATIONS

This application is a continuation of U.S. utility patent application Ser. No. 17/973,210, filed Oct. 25, 2022, titled "System and Method For Configuring An Adaptive Computing Cluster," which is a continuation of U.S. utility patent application Ser. No. 16/175,633, filed Oct. 30, 2018, titled "System and Method For Configuring An Adaptive Computing Cluster," issued as U.S. Pat. No. 11,888,689 on Oct. 25, 2022, which claims the benefit of U.S. provisional patent application 62/579,649, filed Oct. 31, 2017, titled "Rapidly Deployed Computing Cluster System and Methods," the entirety of the disclosures of which are hereby incorporated by this reference.

TECHNICAL FIELD

Aspects of this document relate generally to the configuration and operation of adaptive computer clusters.

BACKGROUND

Modern computing technology can be a blessing and a curse when applied beyond the scope of personal use. Computing solutions can provide greater efficiency and expanded services when properly adapted to a specific task. However, such customized applications have traditionally been developed at great cost, both in time and resources. Furthermore, the advantages provided by such a system can quickly become mission-critical. The cost of development and time to deploy new systems that make use of the latest technologies can effectively lock a party into a system that grows more and more outdated over time.

SUMMARY

According to one aspect, a system for configuring an adaptive computer cluster includes a cluster configuration server communicatively coupled to a cluster hosting environment through a network. The cluster configuration server has a processor and a memory. The memory includes a plurality of inert containers and a configuration tool configured to receive at least one procedure having a trigger event and at least one task and further configured to instruct the cluster hosting environment to instantiate the adaptive computer cluster based upon the at least one procedure and using at least one of the plurality of inert containers. The instantiation instructions include instructions to instantiate, within the cluster hosting environment, an API gateway container, a storage container, a distributed computing master node container, at least one solution-specific container, and an orchestrator container. The API gateway container has an authentication unit, a logging unit, and at least one client-specific plugin. The API gateway container is communicatively coupled to at least one of a data source and a client device through the network. The storage container includes a database. The distributed computing master node container is configured to instantiate and control at least one slave node container, as needed. The at least one solution-specific container is selected based upon the at least one procedure received by the configuration tool. The orchestrator container includes an event detection unit, a job assembly unit, and a job scheduling unit.

The instructions from the configuration tool further include instructions to communicatively couple the API gateway container, the storage container, the distributed computing master node container, and the at least one solution specific container to the orchestrator container. The configuration tool instructs the instantiation of the orchestrator container such that, for each of the at least one procedure received by the configuration tool, the event detection unit is configured to detect the occurrence of the trigger event and the job assembly unit is configured to associate each of the at least one task with at least one of the containers within the adaptive computer cluster being instantiated.

Particular embodiments may comprise one or more of the following features. The cluster hosting environment may be a cloud-based environment. The at least one solution-specific container may include an automated data cleansing container configured to receive a data object associated with one of the at least one procedure, prepare the data object for an operation associated with said procedure by identifying missing data generating replacement data, and/or output a cleansed data object. The automated data cleansing container may be further configured to generate a report describing at least one statistical property of the data object. The at least one solution-specific container may include an automated machine learning container configured to receive a data object associated with one of the at least one procedure and a target metric associated with the procedure, automatically generate a plurality of machine learning models based upon the data object to predict the target metric, rank the plurality of machine learning models based upon ability to predict the target metric, and/or instantiate a machine learning model container based upon one of the plurality of generated machine learning models. The machine learning model container may be communicatively coupled to the orchestrator container. The adaptive computing cluster may be further configured such that the automated machine learning container receives the data object directly from a data cleansing container. The automated machine learning container may be further configured to generate a report indicating the rank of each of the plurality of machine learning models and/or at least one parameter associated with the generation of each of the plurality of machine learning models, receive at least one modified parameter, and/or regenerate at least one machine learning model based upon the at least one modified parameter. The at least one solution-specific container may include a machine learning model container having a machine learning model and may be configured to receive a data object associated with one of the at least one procedure and a target metric associated with the procedure, and/or generate a predicted value for the target metric by applying the machine learning model to the data object. The at least one solution-specific container may include a blockchain peer container having a world state database and a transactional ledger and may be communicatively coupled to a blockchain network. The blockchain peer container may be configured to retrieve a data object from one of the transactional ledger and the world state database in response to a task assigned by the job scheduling unit of the orchestrator container, and may be further configured to submit a proposed transaction to the blockchain network. Finally, the blockchain peer container may include a smart contract associated with one of the at least one procedure and configured to automatically execute the smart contract in response to a request received from the blockchain network.

According to another aspect of the disclosure, a method for configuring an adaptive computer cluster includes receiving, through a configuration tool, at least one procedure comprising a trigger event and at least one task, and instantiating, within a cluster hosting environment, a plurality of containers chosen from a plurality of inert containers and configured based upon the at least one procedure. The plurality of containers include an API gateway container having an authentication unit, a logging unit, and at least one client-specific plugin. The API gateway container is communicatively coupled to at least one of a data source and a client device through a network. The plurality of containers further includes a storage container having a database, as well as at least one solution-specific container selected based upon the at least one procedure received by the configuration tool. The plurality of containers also includes an orchestrator container having an event detection unit, a job assembly unit, and a job scheduling unit. The method further includes binding the plurality of containers to each other by communicatively coupling the API gateway container, the storage container, and the at least one solution specific container to the orchestrator container. Finally, the method includes configuring the event detection unit to detect the occurrence of the trigger event and the job assembly unit to associate each of the at least one task with at least one of the containers within the adaptive computer cluster.

Particular embodiments may comprise one or more of the following features. The cluster hosting environment may be a cloud-based environment. The at least one solution-specific container may include an automated data cleansing container configured to receive a data object associated with one of the at least one procedure, prepare the data object for an operation associated with said procedure by identifying missing data generating replacement data, and/or output a cleansed data object. The automated data cleansing container may be further configured to generate a report describing at least one statistical property of the data object. The at least one solution-specific container may include an automated machine learning container configured to receive a data object associated with one of the at least one procedure and a target metric associated with the procedure, automatically generate a plurality of machine learning models based upon the data object to predict the target metric, rank the plurality of machine learning models based upon ability to predict the target metric, and/or instantiate a machine learning model container based upon one of the plurality of generated machine learning models. The machine learning model container may be communicatively coupled to the orchestrator container. The adaptive computing cluster may be further configured such that the automated machine learning container receives the data object directly from a data cleansing container. The automated machine learning container may be further configured to generate a report indicating the rank of each of the plurality of machine learning models and/or at least one parameter associated with the generation of each of the plurality of machine learning models, receive at least one modified parameter, and/or regenerate at least one machine learning model based upon the at least one modified parameter. The at least one solution-specific container may include a machine learning model container having a machine learning model and may be configured to receive a data object associated with one of the at least one procedure and a target metric associated with the procedure, and/or generate a predicted value for the target metric by applying the machine learning model to the data object. The at least one solution-specific container may include a blockchain peer container having a world state database and a transactional ledger and may be communicatively coupled to a blockchain network. The blockchain peer container may be configured to retrieve a data object from one of the transactional ledger and the world state database in response to a task assigned by the job scheduling unit of the orchestrator container, and may be further configured to submit a proposed transaction to the blockchain network. Finally, the blockchain peer container may include a smart contract associated with one of the at least one procedure and configured to automatically execute the smart contract in response to a request received from the blockchain network.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DETAILED DESCRIPTION

Figure 1:
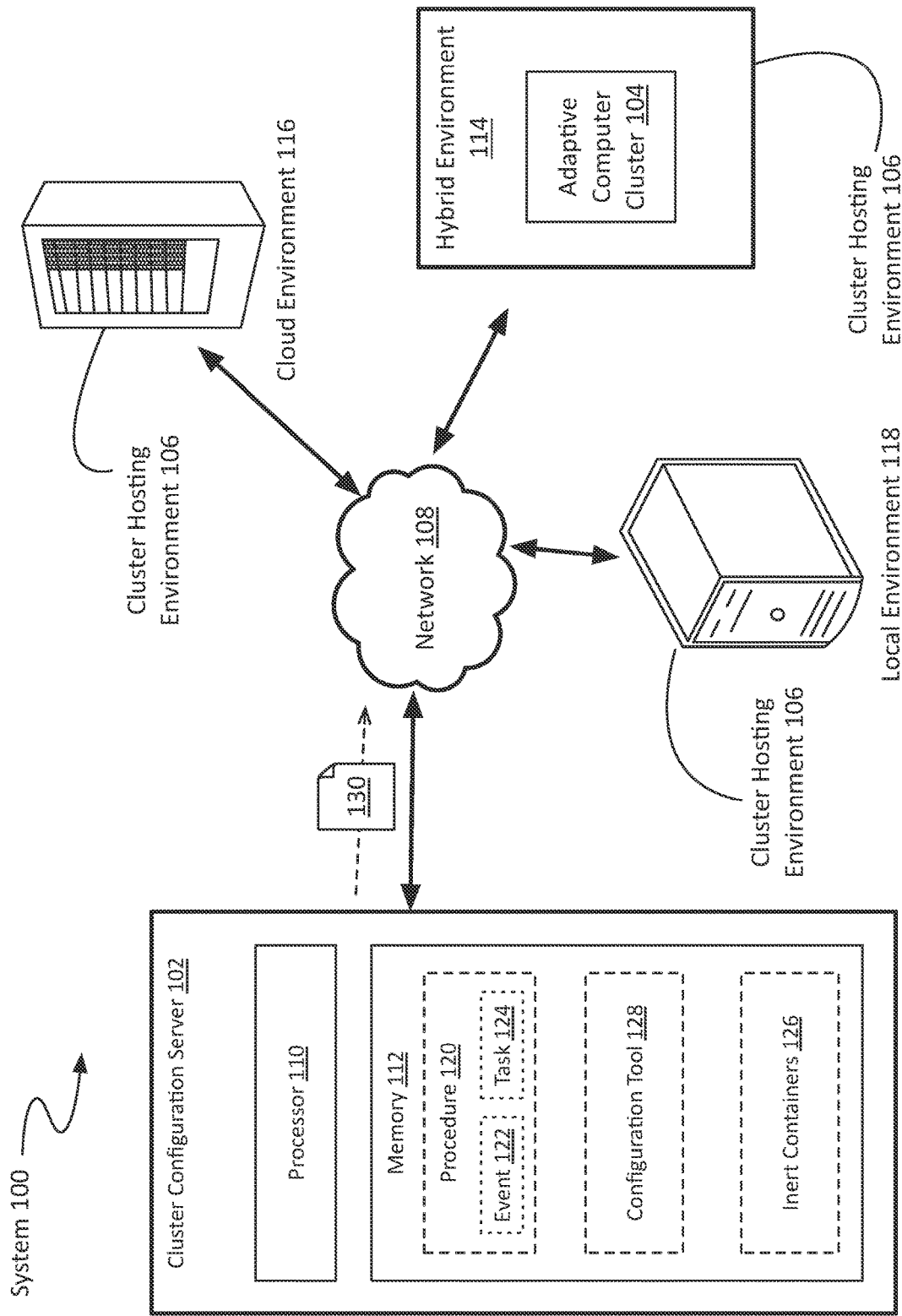
FIG. 1 is a network view of a system for configuring an adaptive computer cluster.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Modern computing technology can be a blessing and a curse when applied beyond the scope of personal use. Computing solutions can provide greater efficiency and expanded services when properly adapted to a specific task. However, such customized applications have traditionally been developed at great cost, both in time and resources. Furthermore, the advantages provided by such a system can quickly become mission-critical. The cost of development and time to deploy new systems that make use of the latest technologies can effectively lock a party into a system that grows more and more outdated over time.

Contemplated herein is a system and method for configuring and rapidly deploying computing clusters that are adaptive and application specific. Conventional methods often require an extended period of time before demonstrable value can be seen. The clusters contemplated herein can be configured in a matter of days, and show value in a matter of weeks, rather than months or years. Furthermore, the clusters may be quickly adapted to newer technologies such as internet of things, blockchain networks, and machine learning, and can also marry older technologies and services with the latest and greatest. The contemplated clusters can quickly be configured, deployed, and adapted to a user's changing needs.

In the context of the present description, a cluster refers to a plurality of computers or computer-equivalents (e.g. virtual machines, containers, etc.) working together. The foregoing discussion will speak of clusters in the context of containers. However, those skilled in the art will recognize that such clusters may also be implemented in other computer abstractions such as virtual machines, as well as discrete pieces of hardware, including commodity general purpose machines. Accordingly, while the use of a containerized implementation provides a number of advantages, those skilled in the art will recognize that these adaptive computer clusters could be implemented in other environments. The systems and clusters contemplated herein may be adapted to address the needs of a wide range of industries, including but not limited to, manufacturing, warehouse management, supply chain management, transportation, aerospace, defense, healthcare, retail, consumer, public sector, facility management, real estate, call centers, CRM, telecommunications, energy, utilities, financial services, and insurance.

The systems and methods contemplated herein provide a number of advantages over conventional application-specific computer systems and the methods for creating them. Abstracting the cluster into containers, or discrete computing units that are configured for a narrow task, such as retrieving data or applying a machine learning model, allows for rapid configuration of a cluster at minimal expense, since the building blocks may be reused, reducing development time and cost. Furthermore, breaking down the system in such a way allows for the establishment of a standard interface between containers or units, permitting cutting edge technology to be incorporated into a cluster with minimal disruption. For example, in conventional systems the addition of a blockchain network may require a great deal of work to interface with proprietary systems, while in an adaptive computer cluster configured using the systems and methods disclosed herein, a blockchain network can simply be another known data source.

FIG. 1 shows a network view of a non-limiting example of a system 100 for configuring an adaptive computer cluster. As shown, the system 100 comprises a cluster configuration server 102 communicatively coupled to a network 108, the server comprising a processor 110, a memory 112, and a storage 114. In some embodiments, the memory 112 may include non-volatile memory, and may include one or more databases or other forms of storage.

According to various embodiments, the cluster configuration server 102 is used to configure and deploy customized, application-specific adaptive computer clusters 104 in one or more cluster hosting environments 106. As shown, the memory 112 comprises a configuration tool 128. In some embodiments, the memory 112 of the cluster configuration server 102 may also comprise a plurality of inert containers 126.

According to various embodiments, the configuration tool 128 is a collection of instructions that facilitates the rapid configuration and deployment of adaptive computer clusters 104. The makeup of an application-specific cluster 104 depends greatly upon the specific use or uses to which it will be put. The configuration tool is able to receive one or more defined procedures 120, and based upon those procedures 120, instantiate an adaptive computer cluster 104 configured to accomplish the specified procedures 120. The cluster 104 is instantiated within a cluster-hosting environment 106.

In the context of the present description and the claims that follow, a procedure 120 is an object that defines a portion of the functionality of an adaptive computer cluster 104. As shown, a procedure 120 comprises a trigger event 122 and at least one task 124. Upon detection of the trigger event 122, the at least one tasks 124 are carried out, as will be discussed in greater detail below. Advantageous over conventional methods of configuring application-specific computing systems, the contemplated methods and systems disclosed herein are built upon the trigger-event relationship, lending them to greater degrees of automation, streamlining processes and providing a quicker return on investment when applied to new problems. Examples shall be discussed below.

Instantiation of the cluster 104 further includes configuring the various containers that make up the cluster for the anticipated operations, and binding them together. Such binding may include, but is not limited to, configuration of a virtual network allowing inter-container communication according to specific rules based upon the specified procedures 120. The different containers that may be utilized in an adaptive computer cluster 104 defined by the configuration tool 128 will be discussed in greater detail with respect to FIGS. 2-9.

In some embodiments, the configuration tool 128 may generate a configuration file or instructions 130 from which a cluster 104 may be reconstituted using industry standard containerized software solutions, such as Kubernetes or Docker. In other embodiments, the configuration tool 128 may generate a package of executable binaries, which may be compressed, and which may be deployed directly to a cluster-hosting environment 106. The cluster hosting environments 106 will be discussed in greater detail below.

As previously mentioned, the memory 112 of the cluster configuration server 102 may also comprise a plurality of inert containers 126. In the context of the present description, and inert container 126 is a container that is in a generalized state, and has not been configured for a specific purpose (yet). Advantageous over conventional application-specific computing solutions, the system 100, methods and clusters 104 contemplated herein may make use of repurposed containers (i.e. containers developed and used in other clusters 104 or for other purposes). In this way, a customized solution may be quickly constructed using a collection of already defined and polished tools configured to work together in a predictable way (e.g. use standardized interfaces, data formats, etc.), and may be fortified by solution-specific containers that may serve to interface with unique, proprietary data sources or other systems (e.g. custom inventory management system, etc.). Abstracting the cluster architecture to a collection of containers allows for deployment without the cost and delay of starting from scratch as is often required with conventional systems and methods.

In some embodiments, an inert container 126 is one that cannot be used, until further processing is performed. For example, in some embodiments, an inert container 126 may comprise a listing of software packages and their dependencies, as well as one or more accessible repositories where the source code and compiling scripts may be found. In some embodiment, the cluster configuration server 102 may further serve as such a repository. In other embodiments, the plurality of inert containers 126 may be compressed binary files compiled for specific execution environments (e.g. cloud platform, chip architecture, operating system, etc.).

Computing clusters 104 defined and configured by the configuration tool 128 may be deployed in a variety of cluster hosting environments 106. Some clusters 104 may be deployed in local environments 118, including commodity level, general-purpose computer hardware. In some cases, such a deployment may be preferred by a user, to allow physical control of the cluster 104, and maybe to comply with various regulations or laws concerning the treatment of certain types of sensitive data. Other clusters 104 may be deployed in a cloud environment 116, utilizing a service made up of a collection of networked, distributed computers, as is known in the art. Cloud deployments present a number of advantages to a user, including removing the responsibility of computer hardware maintenance. Furthermore, cloud deployments allow for rapid scaling of the cluster, depending on the demand for resources. For example, during peak use, additional resources may be temporarily accessed in the cloud, as opposed to having to purchase and maintain local hardware sufficient for the peak load, even if such a peak is only periodic.

In some embodiments, a cluster 104 may be deployed in a hybrid environment 114, meaning it makes use of local and cloud resources. Such an implementation may be advantageous in a number of cases. For example, a hybrid cloud deployment may scale with demand by shifting additional load onto additional, temporary cloud resources. As another example, a hybrid cloud deployment may be used to situate parts of the cluster 104 geographically closer to heavy data streams, reducing latency for initial computing phases, and making use of local hardware for less time sensitive operations.

As previously discussed, the execution environment itself may be abstracted, making use of virtual machines or containers, as is known in the art. Containers are advantageous, as their lack of operating system makes them more efficient than virtual machines, while still providing the same isolated environment. The use of an abstracted execution environment further facilitates the provision of highly available containers (e.g. deployment on multiple machines or clouds for fail-over, etc.). According to some embodiments, the cluster configuration tool 128 may create adaptive computer clusters 104 that may be self-healing. Since the containers are known commodities, if one fails, crashes, or otherwise misbehaves, it can quickly be replaced with a newly instantiated copy of the same container, or a rolled back version of the container.

The use of containers for the creation of adaptive computer cluster 104 is advantageous over conventional methods for creating application-specific computing systems, as they can be hardware agnostic. In many conventional systems, upgrading to new or updated hardware may require a great deal of work (and expense), often resulting in systems getting locked in to aging hardware. Building a cluster 104 using containers means that only the container execution framework needs to be updated to take advantage of new or different hardware.

Figure 2:
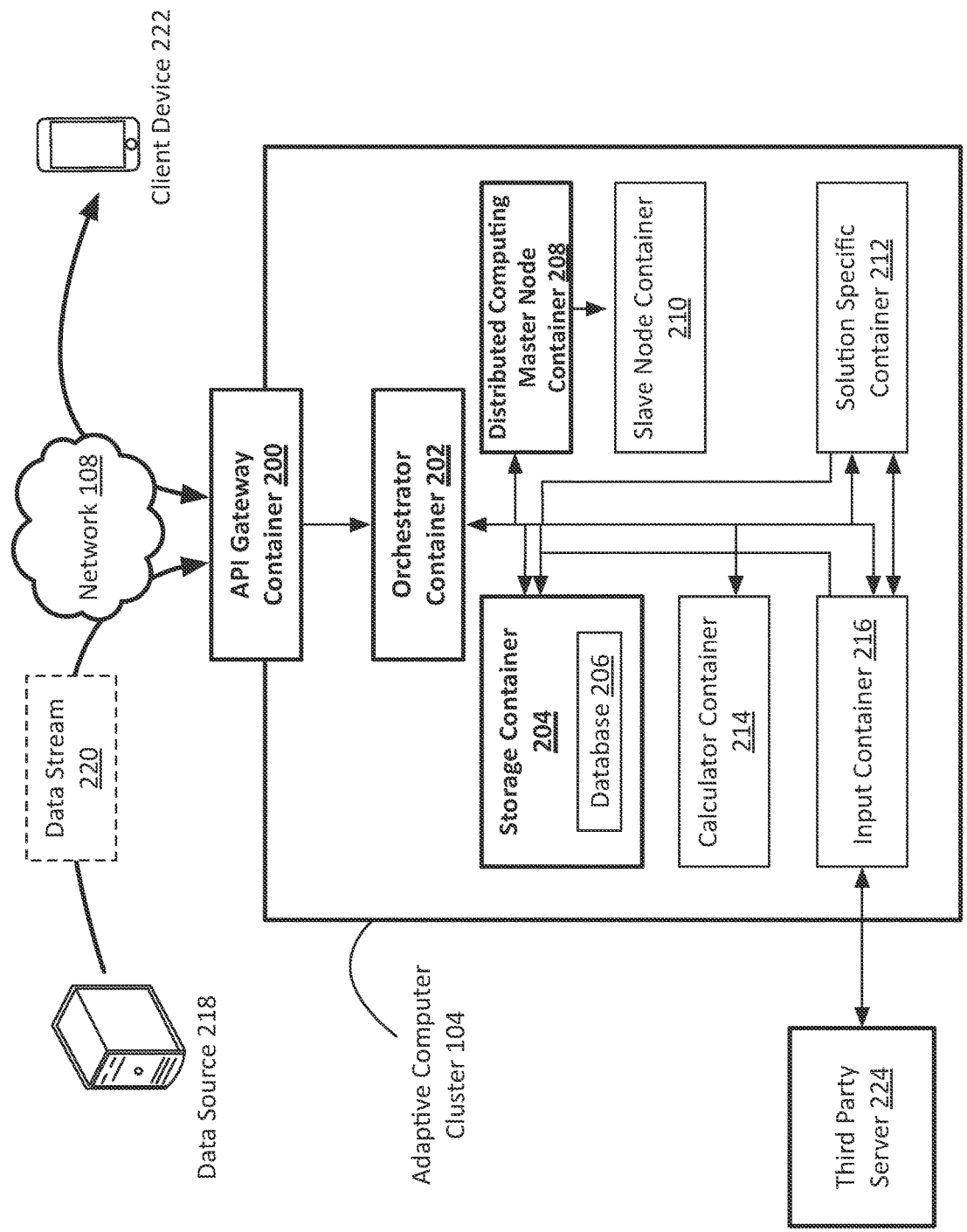
FIG. 2 is a schematic view of an adaptive computer cluster.

FIG. 2 shows a schematic view of a non-limiting example of an adaptive computing cluster 104 deployed by a cluster configuration server 102. As previously discussed, the adaptive computing cluster 104 comprises a number of containers, which are chosen depending on the intended application for the cluster 104 as described by the one or more procedures 120 received by the configuration tool 128. According to various embodiments, a core set of containers may be used by the configuration tool 128 as a starting point, with additional solution specific containers 212 added as needed. The non-limiting example shown in FIG. 2 comprises these core containers: an API gateway container 200, an Orchestrator container 202, a storage container 204, and a distributed computing master node container 208. Each of these containers will be discussed further, below. It should be clear to those skilled in the art that other embodiments may make use of, or may be constructed upon, a different set of core containers. For example, in some embodiments, the core set does not include distributed computing containers.

According to various embodiments, an API Gateway container 200 is standard point of input for the adaptive computing cluster 104, and stands between the Orchestrator container 202 and the world. It may be used to allow external access to the orchestrator 202 or other aspects of the cluster 104. For example, in some embodiments, a client device 222 may be able to interact with the cluster 104 solely through the API gateway 200. In some embodiments, the API Gateway container 200 is the only container with an externally addressable IP address. As shown, the API Gateway 200 may receive a data stream 220 from a data source 218. Examples of data sources 218 include, but are not limited to, external databases or other storage, servers, APIs, input devices, and the like. The API Gateway container 200 will be discussed in greater detail with respect to FIG. 3, below.

In the context of the present description, an Orchestrator container 202 (also referred to as the orchestrator 202) is a container configured to carry out the intended purpose or purposes of a particular computing cluster 104 by receiving inputs, detecting trigger events 122, and tasking one or more containers within the cluster 104 to perform specific tasks 124 associated with the trigger event 122. Data streams 220 received at the API Gateway container 200 from a data source 218 are passed on to the Orchestrator 202. In some embodiments, the Orchestrator container 202 serves to validate the incoming data, in addition to determining which actions need to be taken. According to various embodiments, the Orchestrator container 202 may be configured such that tasks may be carried out asynchronously. The Orchestrator container 202 will be discussed in greater detail with respect to FIG. 4, below.

A storage container 204 is part of the core set of containers in some embodiments. As shown, the storage container 204 may comprise a database 206, such as a noSQL database. The use of a noSQL database in a storage container 204 as part of the core containers may be advantageous since it may be easily adapted to a variety of data types and organizations, and does not require predefined data structures like other types of databases. An example noSQL database may be Mongo database. According to various embodiments, this container may serve as a default data storage container for application. As shall be discussed below, a cluster may further include additional storage containers 204, employing storage of any type known in the art (not limited to noSQL).

The inclusion of a distributed computing master node container 208 in a core set of containers allows a cluster 104 to perform computationally intensive operations by spreading the load across multiple slave node containers 210. In some embodiments, the distributed master node container 208 may be configured to scale within the limits of the cluster's execution environment (e.g. localized, cloud, hybrid, etc.), only sequestering the computational resources (i.e. instantiating slave nodes 210) as the need arises. In some embodiments, the slave nodes 210 may only communicate with the master node 208, while in others the slave nodes 210 may pull data from other containers or external sources without requiring the data to move through the master node 208. Such a configuration provides an efficient way to accomplish computationally intensive operations made up of calculations of significant volume and/or complexity.

As shown in the non-limiting example of a computing cluster 104 in FIG. 2, additional containers may be instantiated by the Orchestrator container 202, per the configuration tool 128. By utilizing a collection of generalized containers instead of a few specialized containers, the containers may be reused in multiple computing clusters 104 having a variety of applications.

One type of container that may be used is an input container 216. In the context of the present description, an input container 216 is a container that has been configured to retrieve data from, or interact with, an external resource such as a third party server 224. One example of an input container 216 is a database interface container, which is configured to interact with an external database of a particular type. Another example is an Internet of things input container, which may also comprise a storage element to buffer a high volume of inputs directly without overloading the API gateway 200 or orchestrator 202.

Another example of an input container 216 is a web scraper, which may be used to retrieve data by interacting with a web page or web portal. In some embodiments, the interaction may simulate the actions of a human user. For example, an input container 216 configured for web scraping may utilized optical character recognition (OCR) and/or machine vision to analyze the web interface and direct the needed input. The use of such technology may allow for the configuration of an adaptable input container 216 that does not break when cosmetic changes are made to a web site.

In some embodiments, an input container 216 may function as a data aggregator. In the context of the present description, a data aggregator is a tool that allows for the collection, reformatting, and consolidation of data. The data aggregator may stand as an interface between proprietary or internal systems used by an organization (e.g. internal records system, inventory system, accounting system, patient records system, etc.) and the network of containers within a cluster 104. The data aggregator allows an organization to provide information or otherwise interact with and participate in a shared endeavor of a cluster 104, without requiring a complete overhaul of systems that may have been the result millions of dollars and years of effort. Each organization may use different internal systems, and input containers 216 operating as data aggregators provide a way to quickly place all of the shared data in a common format. The use of a consistent format facilitates automation of the system, as well as other features such as private peer-to-peer information sharing, or implementation of a blockchain network, which will be discussed in greater detail with respect to FIG. 9, below. In some embodiments, an input container 216 may employ some form of automation, while other embodiments may make use of artificial intelligence, to recognize patterns, formats, and data types, as well as reduce faulty reads.

A computing cluster 104 may employ one or more calculation containers 214, ranging in complexity from executing simple computations to performing rigorous statistical analysis of large data sets. Some calculation containers 214 may be instantiated and utilized in a general form (e.g. container receives data and a description of the needed operations). Other embodiments of a calculation container may be configured such that a specific operation may be performed with great efficiency (e.g. optimization for GPU execution, optimization for FPGA execution, etc.).

As discussed previously, the Orchestrator 202 examines the data streams it receives from the API Gateway 200 and determines what should be done. In some embodiments, a high volume data container may be configured to directly receive a large data stream, such as output of a large collection of IoT sensors, without bogging down the orchestrator 202. Data received at the Orchestrator 202 may be used to trigger particular operations that may then make use of some of the data that has been received/retrieved and possibly processed by the high volume container. Additional solution-specific containers 212 will be discussed with respect to FIG. 5.

As shown, the various containers are communicatively coupled to each other through the orchestrator 202, according to various embodiments. In some cases, the orchestrator 202 may dynamically change the routing, such that one container can communicate directly with another container rather than passing the intermediate results through the orchestrator 202.

Figure 3:
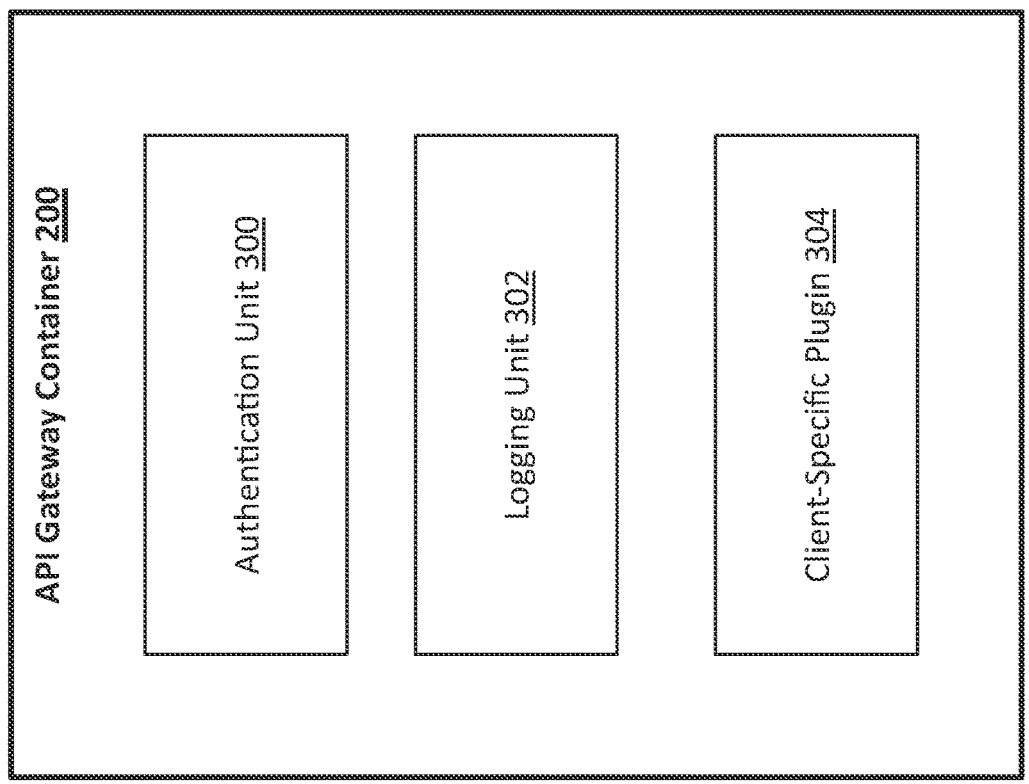
FIG. 3 is a schematic view of an API gateway container.

FIG. 3 shows a schematic view of a non-limiting example of an API Gateway container 200, for use in an adaptive computing cluster 104. As previously discussed, the API Gateway container 200 stands between the world and the Orchestrator container 202. According to various embodiments, external access to the Orchestrator 202 or other containers may be possible only through the API Gateway 200, depending upon the configuration.

As shown, an API Gateway container 200 may comprise various units, including an authentication unit 300, a logging unit 302, and one or more client specific plugins 304. In some embodiments, additional or different units may be employed. The authentication unit 300 may be used to authenticate remote user logins, and may grant varying degrees of access to the containers inside the cluster. The authentication unit 300 may implement any of a variety of security protocols. This unit may further include rate-limiting functionality, to prevent a cluster 104 from being overwhelmed. As an option, the rate limiting functionality may vary its response depending on the type of login. For example, attempted user login requests may have a much tighter limit than data streams.

The logging unit 302 of an API Gateway 200 may be configured to record the details of interactions with the API Gateway container 200 (e.g. user logins, incoming data streams, etc.). Such information may be useful for troubleshooting, or even for forensic purposes in the case of a breach or attempted breach.

Finally, an API Gateway container 200 may comprise one or more client specific plugins 304. These plugins 304 may provide commonly requested information or reports, possibly generated by a reporting container. In some embodiments, a plugin 304 may allow for interaction between the API Gateway 200 and a mobile application, a web portal, or any other interface known in the art. As a specific example, a client-specific plugin 304 may be configured to interact with a client device 222 running interface software.

In some embodiments, all data is received through the API Gateway container 200. In other embodiments, individual containers may be configured by the Orchestrator 202 to obtain data directly from external sources 218, as discussed above.

Figure 4:
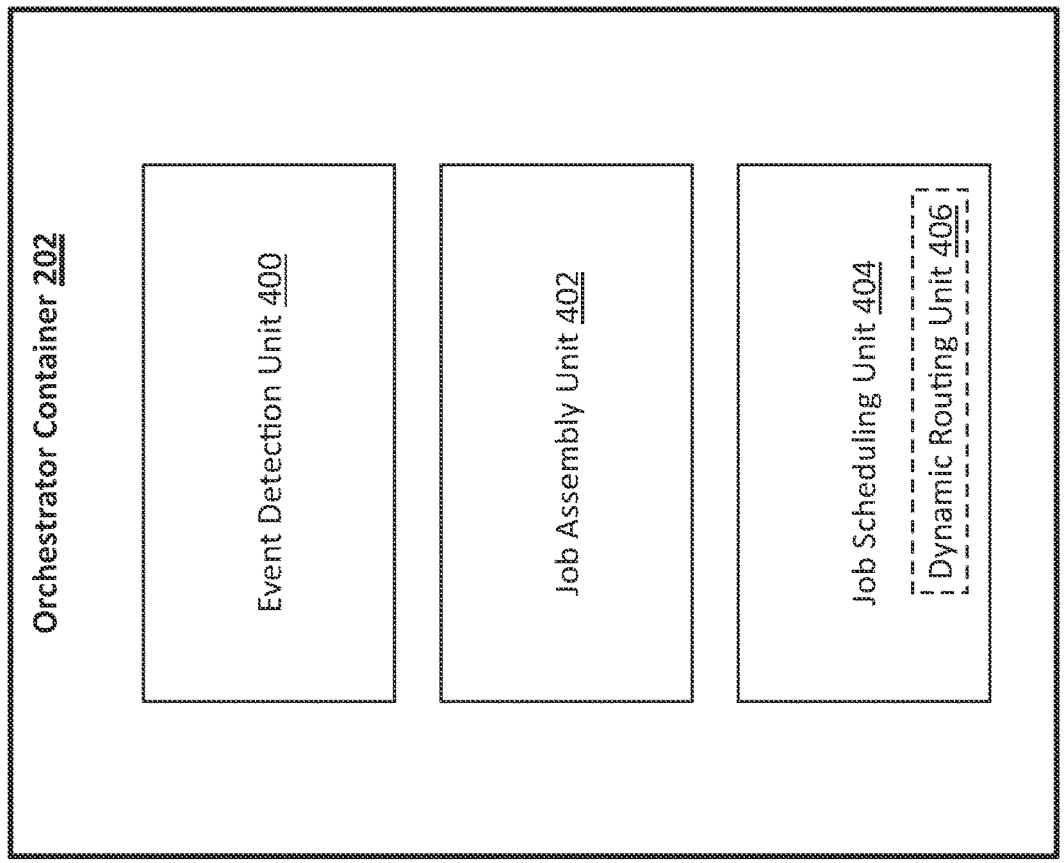
FIG. 4 is a schematic view of an Orchestrator container.

FIG. 4 shows a schematic view of a non-limiting example of an Orchestrator container 202. As previously discussed, the Orchestrator 202 directs the activities within the adaptive computer cluster 104. Streaming data received by the API Gateway 200 is sent to the Orchestrator 202, where its fate is decided based upon a preconfigured set of rules (e.g. configured with the configuration tool, defined by the trigger events 122, etc.). Said rules may exist as, or may be initially defined as, a branching tree of expected situations and scenarios, and may include data validation and error handling, according to various embodiments. In some embodiments, while the decision tree may be static, the threshold values used to select a branch may be dynamic, and may be based upon various factors including previously received data and results of container operations.

In some embodiments, the Orchestrator 202 only receives information from the API Gateway 200, and does not talk back to the API Gateway 200. Furthermore, in some embodiments, the Orchestrator 202 does not perform any computation work beyond the receipt, validation, job building, and scheduling operations, to be discussed below.

As shown, an Orchestrator container 202 may comprise an event detection unit 400, according to various embodiments. In the context of the present description, an event detection unit 400 takes one or more pieces of input data and, based at least in part on procedures 120 or decision trees, determines what action needs to be taken. As one example, an event detection unit 400 may determine what type of data is contained in a data stream 220 (e.g. company profile, market data, etc.) and, based upon the data type, perform a preconfigured action. As another example, an event detection unit 400 may monitor a stream of data coming from a collection of Internet of Things temperature sensors; while the data stream may be immediately shuttled off to storage in a noSQL database container, the event detection unit 400 may further monitor the stream 220 for a temperature that exceeds a threshold. Upon observing such a temperature, the event detection unit 400 may initiate additional operations. In some embodiments, the event detection unit 400 may also handle data verification, which may include handling malformed data, detecting faults in data sources, and the like.

Tasks 124 (e.g. operations, etc.) deemed to be necessary by the event detection unit 400 (e.g. detection of a trigger event 122, etc.) are passed off to the job assembly unit 402, according to various embodiments. The job assembly unit 402 may comprise a collection of instructions for how an operation can be carried out by the computing cluster. In response to the detection of a trigger event 122, the job assembly unit 402 may assemble a series of tasks 124 indicating the type of container (or, in some cases, a specific container) needed, the desired operation, and what should happen to the result (e.g. what kind of container to send it to, etc.).

The job scheduling unit 404 takes the instruction sets from the job assembly unit 402 and assigns them to the various containers of the cluster 104 in an asynchronous manner In some embodiments, tasks or portions of tasks may have an associated priority that may weight its queue position within the job scheduling unit 404. The job scheduling unit 404 may monitor the activity of various containers in the cluster, using methods known in the art, to determine when resources have been freed up and are ready for another task.

In some embodiments, the job assembly unit 402 or the job scheduling unit 404 may make use of a dynamic routing unit 406 and need-based instantiation to adapt to particular work loads. Dynamic routing allows for a task instruction set to include routing directions, such that the output of one container may be directly sent to the next container in the procedure 120, without having to be routed through the Orchestrator 202 first. Need-based instantiation allows the Orchestrator 202 to instantiate additional containers, per the configuration, to meet the current or near-future needs of the cluster 104, within the confines of the cluster hosting environment 106 (e.g. localized, cloud, hybrid, etc.), as previously discussed. In some embodiments, dynamic routing and need-based instantiation may be performed by the job scheduling unit 404, while in other embodiments, one or both functions may be accomplished by the job assembly unit 402.

As a specific example, a computing cluster 104 may be configured to quickly provide a bid on specialized, high cost prescription drugs associated with a patient's discharge from a hospital. Before patients are discharged, a hospital often must ensure the prescribed medications have been sent to a pharmacy that can provide the medication and is compatible with the patients insurance. Such determinations can often take 45 minutes to an hour, between the hospital sending the patient and prescription information to receiving a bid from a pharmacy.

An adaptive computer cluster 104 may be configured by a cluster configuration server 102 such that the API Gateway container 200 is ready to receive information from an electronic health records system (e.g. a hospital's Salesforce application, etc.) containing a patient's name, date of birth, insurance information, and prescription information. The Orchestrator 202 was configured to instantiate two specialized input containers 216, and a calculator container 214. Upon receipt of validated information from the health records system, the event detection unit 400 passes it to the job assembly unit 402, which creates three jobs: obtain insurance data, obtain drug data, and calculate cost. The job assembly unit 402 sends these jobs, each describing what containers are needed, to the job scheduling unit 404, which sends the instruction sets to the appropriate containers when they become available.

The 'obtain insurance data' job comprises sending the patient information and insurance information to a web scraper input container 216, which inputs the information into a web interface for the patient's insurance provider and obtains a description of their coverage. Once this data is obtained, it is sent to the noSQL database 206 of a storage container 204.

The 'obtain drug data' job comprises sending the prescription information to a database input container 216, which interfaces with an external database maintained by the pharmacy in a proprietary format, where it obtains the cost of the prescribed medications. This information is then sent to the noSQL database 206.

In both jobs, when the information is being sent to the noSQL database 206, if there is no record for the patient, one is created. If a record already exists for the patient, the information is added to the record, or the record is updated. The asynchronous nature of the job execution means either job may finish first, depending on a variety of factors such as the speed of external resources or the number of jobs being scheduled.

The 'calculate cost' job comprises sending patient info, or perhaps simply a record index number, to a calculator container 214, which is instructed to monitor the noSQL database 206 for a record for that patient with both coverage information and drug costs. When such a record comes into existence, the calculator container 214 determines the cost to the patient, and updates the record in the noSQL database 206. The calculator container 214 also triggers a reporting event, which may be handled by a separate container (e.g. a reporting container, etc.), or may communicate directly with an outside resource (e.g. the hospital's Salesforce implementation, an email server, etc.). A procedure that traditionally has taken 45 minutes to an hour may be accomplished in 10 to 40 seconds through the use of a computational cluster such as this.

Figure 5:
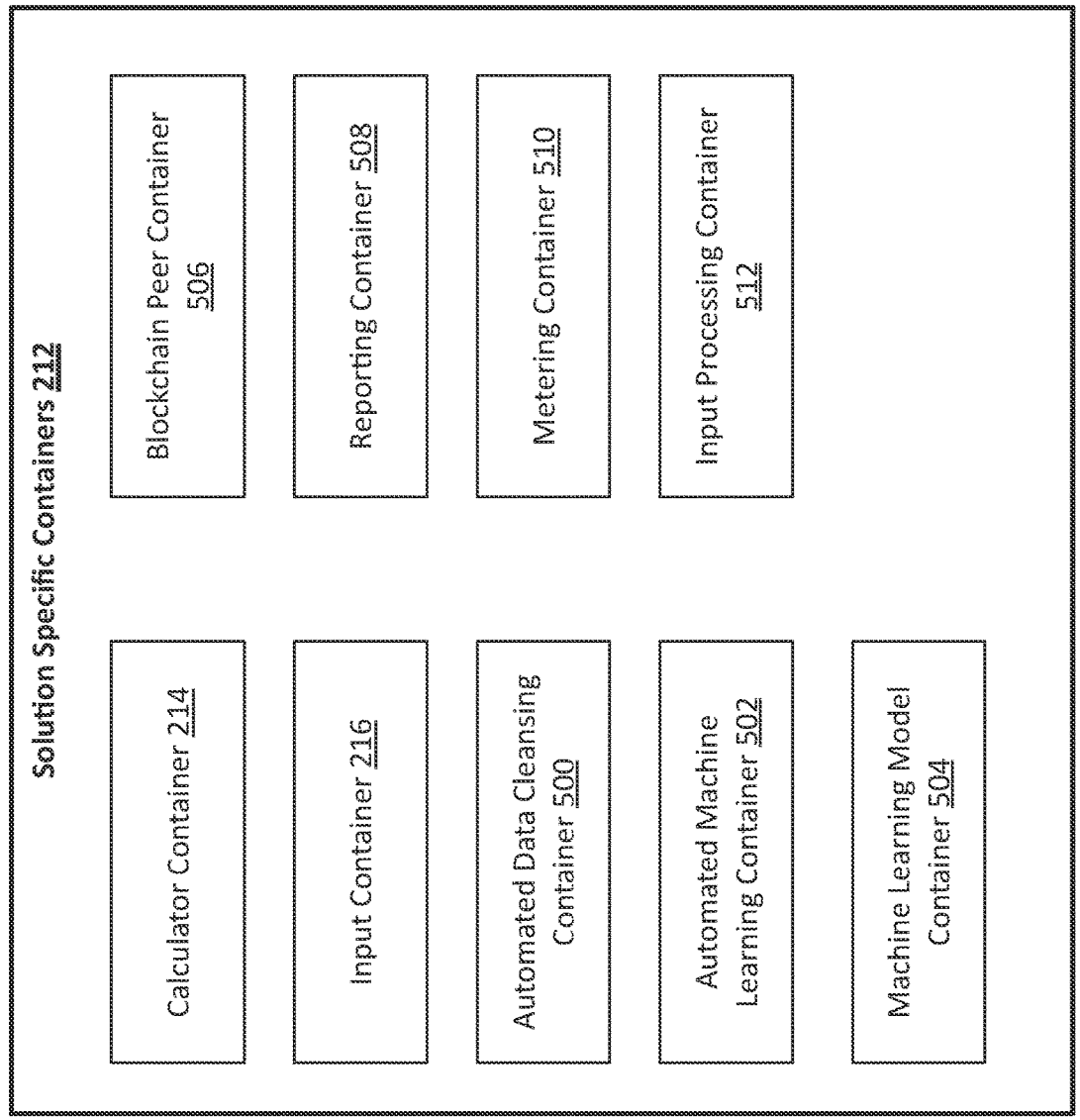
FIG. 5 is a schematic view of a collection of solution specific containers.

FIG. 5 is a schematic view of a non-limiting example of a collection of solution-specific containers 212. As previously discussed, in addition to a core set of containers, an adaptive computer cluster 104 may be configured by a cluster configuration server 102 to make use of one or more solution specific containers 212, which may be configured to perform a type of operation or even a single, specific operation. Calculator 214 and input 216 containers have been discussed above. Other examples of solution-specific containers 212 include, but are not limited to, automated data cleansing containers 500, automated machine learning containers 502, machine learning model containers 504, blockchain peer containers 506, reporting containers 508, and metering containers 510. Those skilled in the art will recognize that any other computation activity may be discretized and implemented in a container environment, such that is may perform a necessary operation on incoming data in response to a detected trigger event.

An automated data cleansing container 500 is a container that can take a data object, which may be a large data set or a single piece of data, and prepares it for further processing, according to various embodiments. The automated data cleansing container 500 will be discussed in greater detail with respect to FIG. 6, below. An automated machine learning container 502 is a container that, given a data set and a target metric, can identify an optimal machine learning model selected from a plurality of models, according to various embodiments. The automated machine learning container 502 will be discussed in greater detail with respect to FIG. 7, below.

A machine learning model container 504 is a container that can apply a defined machine learning model to a set of data, and provide a predicted value for a target metric, according to various embodiments. The machine learning model container 504 will be discussed in greater detail with respect to FIG. 8, below. A blockchain peer container 506 is a container that can interact with a blockchain network, according to various embodiments. The blockchain peer container 506 will be discussed in greater detail with respect to FIG. 9, below.

According to various embodiments, an adaptive computer cluster 104 may comprise a reporting container 508. A reporting container 508 may be configured to provide output in a variety of forms, such as reports or other documents, alerts (e.g. email, text message, etc.), audio (e.g. text-to-speech, etc.), and the like. In some embodiments, a reporting container 508 may be configured to interface with an external system and output the results of an operation (e.g. updating a client file in a Salesforce system, etc.). In other embodiments, the reporting container 508 may generate reporting data on demand. For example, in one embodiment, the reporting container 508 may generate a report in response to a request sent by a client device 222 through the API gateway 200.

In some embodiments, a computing cluster 104 may be configured and instantiated at the behest of a party who is paying by operation rather than based upon time, or a flat rate. In such cases, an adaptive computer cluster 104 may comprise a metering container 510, which may be used to track the operations performed, and which may be queried through the API Gateway 200 for up-to-date resource usage or billing information.

According to various embodiments, an adaptive computer cluster 104 may comprise an input processing container 512. Examples of input processing containers 512 include, but are not limited to, OCR containers, machine vision containers (e.g. recognizing objects using a reference library, facial recognition, etc.), handwriting recognition, natural language processing (e.g. speech recognition, language parsing, lemmatization, etc.), audio fingerprint matching, and the like.

It should be recognized by those skilled in the arts that these are not the only types of containers that may be configured by the cluster configuration server 102 and instantiated in an adaptive computer cluster 104. Depending on the needs of the user, a computing cluster 104 may comprise containers such as those described above, or any others known in the art, or based upon computer operations known in the art. Advantageously, the creation and configuration of an additional type of container for one cluster may be repurposed, at least in part, for another cluster 104.

Figure 6:
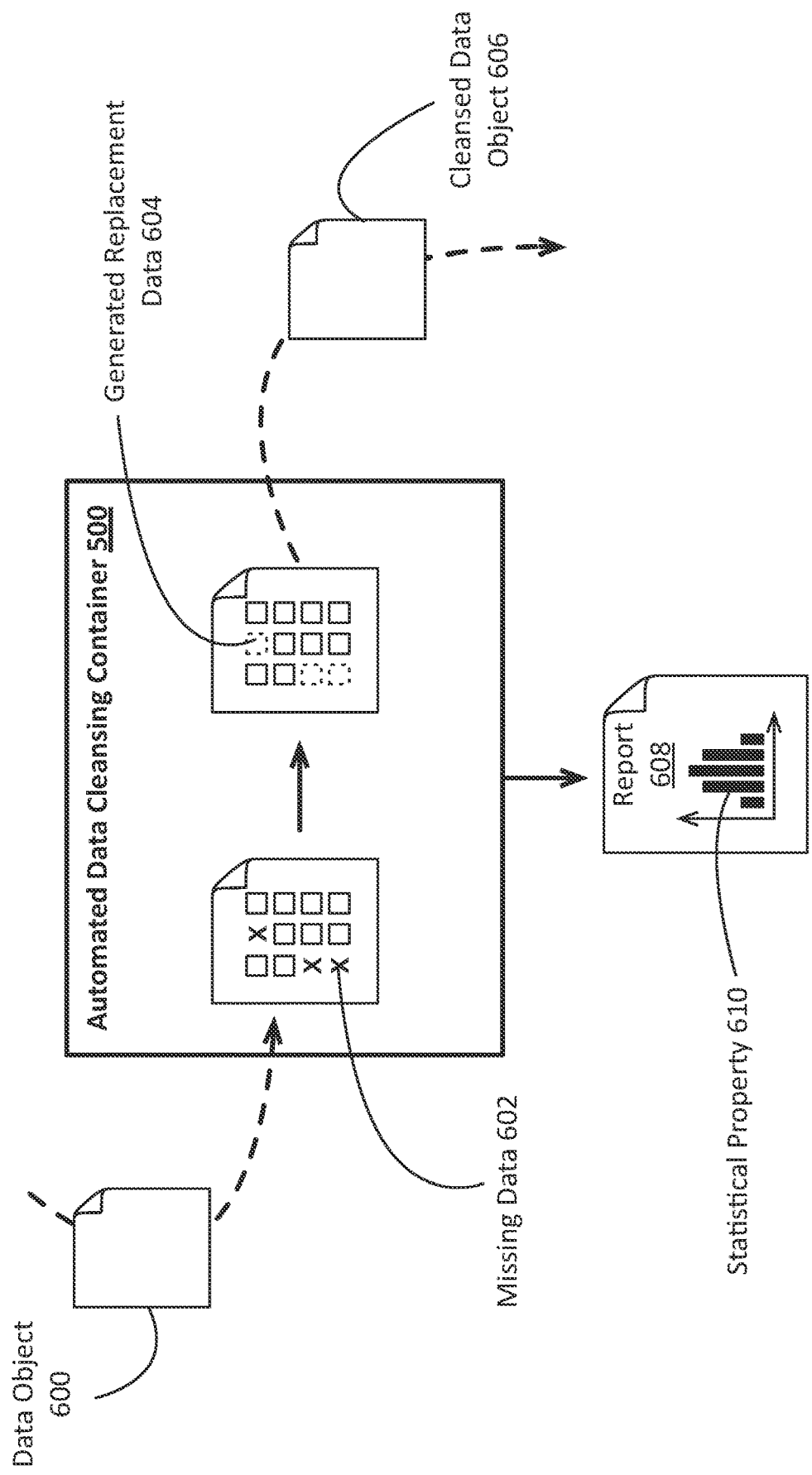
FIG. 6 is a schematic view of an automated data cleansing container.
Figure 7:
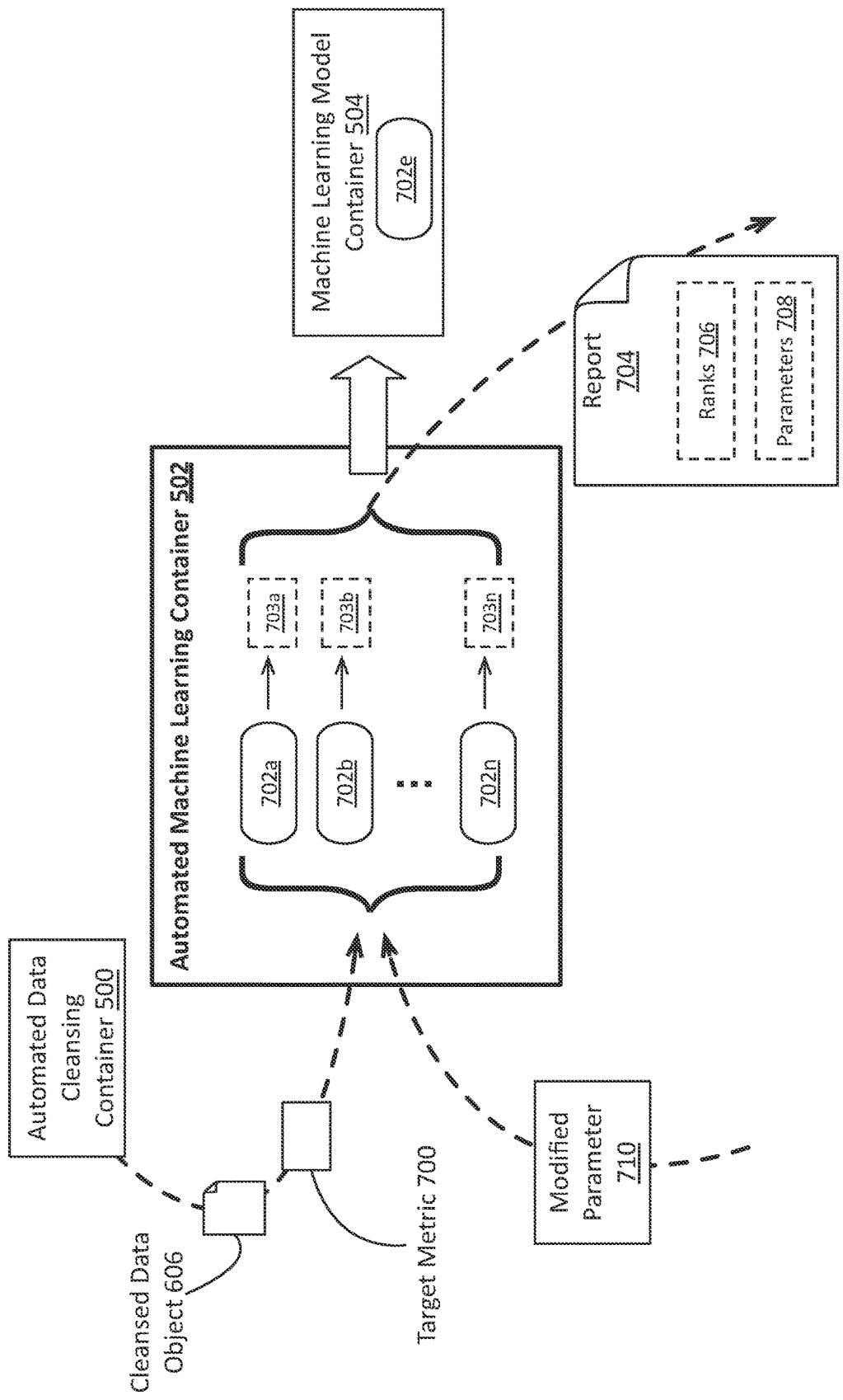
FIG. 7 is a schematic view of an automated machine learning container.
Figure 8:
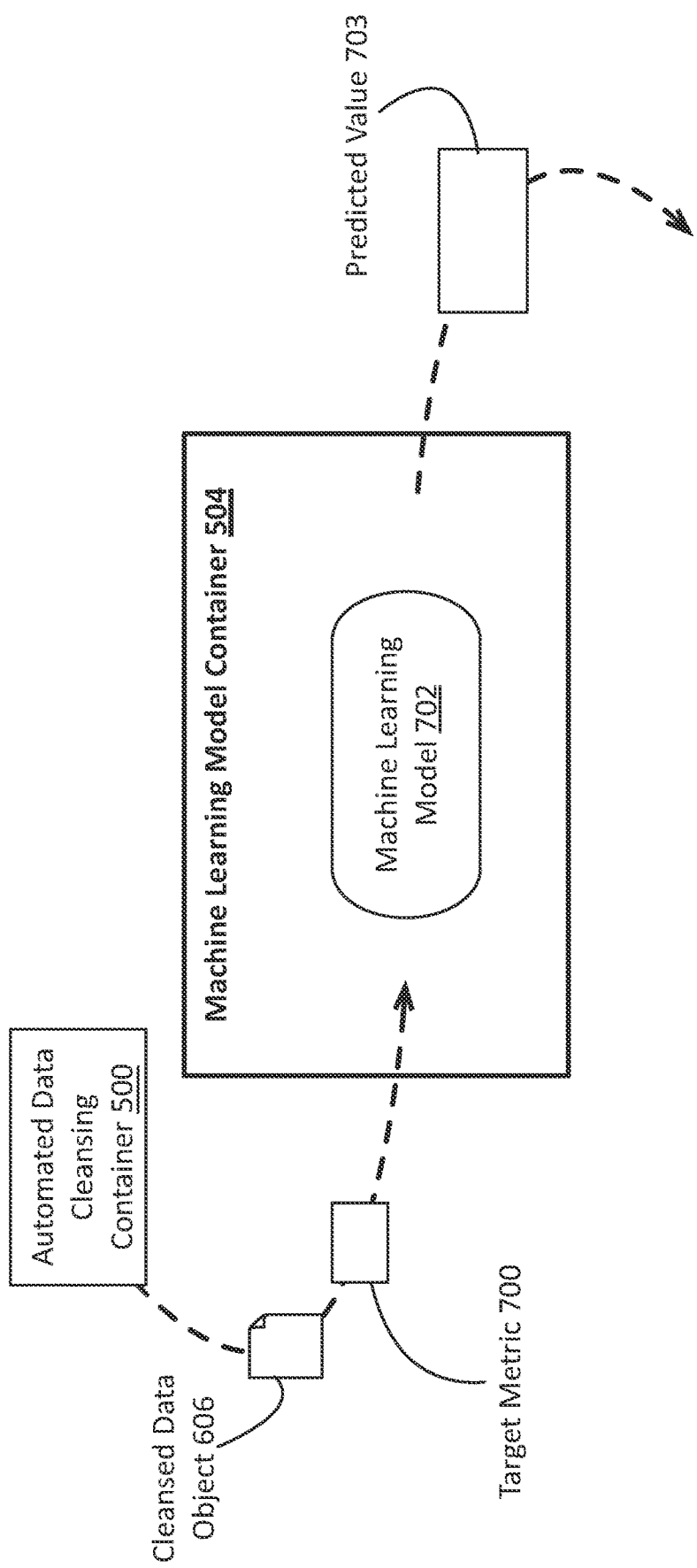
FIG. 8 is a schematic view of a machine learning model container.
Figure 9:
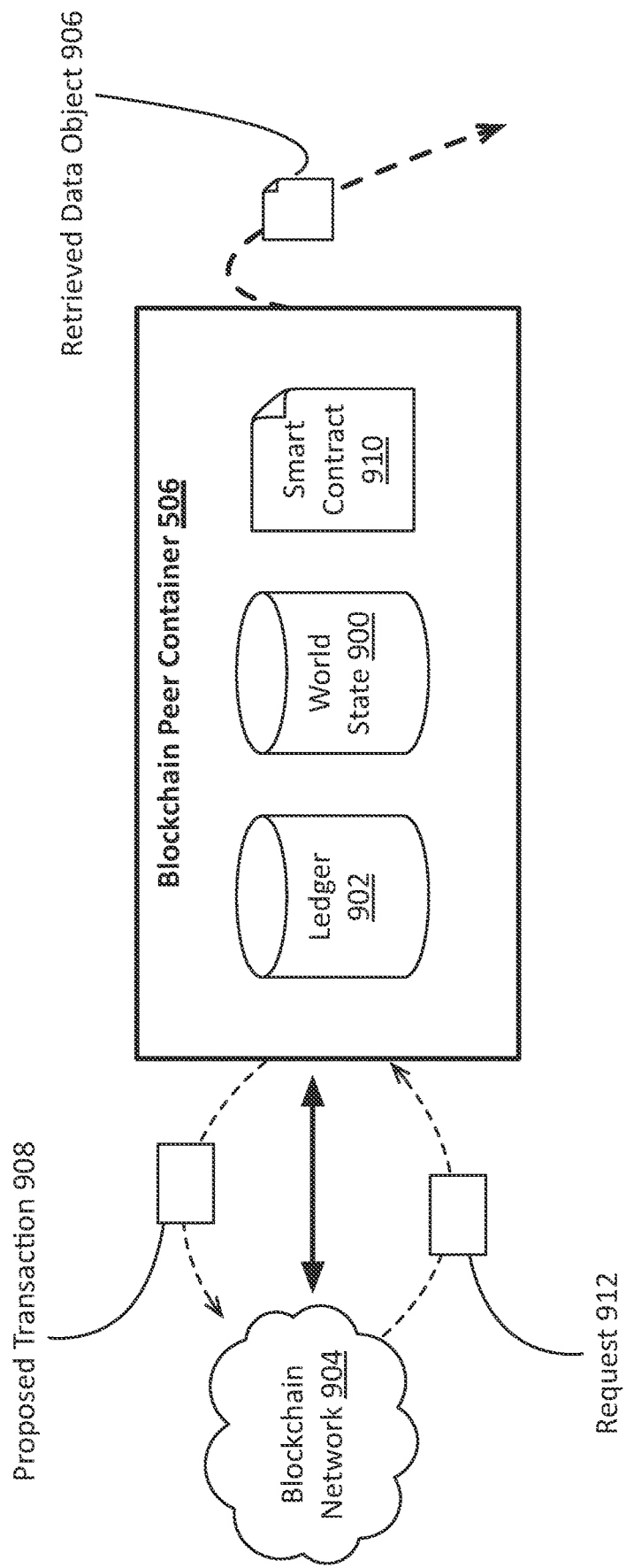
FIG. 9 is a schematic view of a blockchain peer container.

FIG. 6 is a schematic view of a non-limiting example of an automated data cleansing container 500. It should be noted that, while FIG. 6 includes interaction arrows showing how the container processes a data object, it is not shown in a complete implementation context, where it would be coupled to at least the orchestrator 202 of a cluster 104. The interaction arrows in FIG. 6, as well as FIGS. 7-9, are for illustrative purposes only, and are not meant to fully illustrate how these containers fit into a cluster 104.

In many processes that involve analysis of data, such as machine learning model training, an often time-consuming task is the preparation of the data. Large sets of data are often not 100% error free or optimized for their intended purpose. For example, a data set may have a column where most of the values are identical, reducing its value in training a machine learning model. Another example is missing data elements. According to various embodiments, the automated data cleansing container 500 may be configured to automatically prepare data objects 600 that are passed to it, outputting a cleansed data object 606 for further processing.

According to various embodiments, the automated data cleansing container 500 may receive a variety of data objects 600, ranging from a simple file such as an Excel spreadsheet, a CSV file, or even an image or video, to an entire database or other large data objects. Examples of the "cleansing" that may be performed include, but are not limited to, identifying missing data 602 and generating replacement data 604 (e.g. average, rolling average, etc.), eliminating data with variance below a given threshold, unify formatting (e.g. place all dates in the same format, etc.), and the like. Those skilled in the art will recognize other data preparation operations that may be implemented in an automated data cleansing container 500.

In some embodiments, the automated data cleansing container 500 may be configured to automatically output a cleansed data object 606 without further input. In other embodiments, the container may also, or as an alternative, generate a report 608 describing the data, including providing at least one statistical property 610 for each data type/column/row/element. Such a report 610 may assist a data scientist in selecting the best way to optimize the data object 600, and using that information, the automated data cleansing container 500 may be reconfigured to provide a better cleansed data object 606. Examples of statistical properties 610 include, but are not limited to, standard distributions, identification of distribution, most common values, average, and the like.

FIG. 7 is a schematic view of a non-limiting example of an automated machine learning container 502. Conventional implementations of machine learning modules are typically focused on ingesting a specific type of data, and are often essentially a "black box", hiding the particulars of the model being used. Advantageously, the automated machine learning container 502 is able to receive a data object (e.g. a cleansed data object 606 from an automated data cleansing container 500, a raw data object, etc.) and a target metric 700, and automatically generate a number of different ML models, each of which is ranked by its ability to predict the target metric 700. Specifically, for each model 702, a predicted value 703 is calculated. The models 702 are then ranked based upon the predicted value 703 in comparison with the data object 606. Upon identifying the best model (e.g. 702e, etc.), the automated machine learning container 502 instantiates an entire machine learning model container 504 that implements the identified ML model (e.g. 702e), and couples said container 504 to (at least) the orchestrator 202.

In some embodiments, the automated machine learning container 502 may receive a data object 606 directly from an automated data cleansing container 500. In other embodiments, the automated machine learning container 502 may receive a data object 606, cleansed or not, from the orchestrator 202 or some other container.

According to various embodiments, the automated machine learning container 502 may also, or alternatively, generate a report 704 indicating the ranks 706 of all of the models considered, as well as parameters 708 describing each model. This is advantageous over conventional implementations of a generalized ML model, which often obfuscate the model parameters. In contrast to the conventional black box approach which is hard to tune, the report generated by the automated machine learning container 502 allows data scientists to determine how best to tweak a model to get results that are often superior to those obtained programmatically, and implement said tweaks by submitting one or more modified parameters 710 to the automated machine learning container 502. The automated nature of the container allows the data scientist to focus on what humans do best: provide the nuanced context an automated system sometimes misses. Conventional systems require a trial-and-error tuning approach, and the data scientists spend most of their time cleansing data and creating models rather than turning a model that is already close.

The automated machine learning container 502 can reduce the time and expense needed to create a working ML model by orders of magnitude. For example, a conventional system required millions of dollars and six months to create a machine learning model. The automated machine learning container 502 created a superior model from the same data in 2 weeks, at a fraction of the cost.

Another advantage to implementing the adaptive computer cluster 104 in a container environment where data may be swapped in a predictable manner is that the automated machine learning container 502 may operate on data that comes from more than one source, and in some embodiments, may even seek out additional data in the process of refining the models. As a specific example, the automated machine learning container 502 (or in some embodiments, the automated data cleansing container 500) may identify missing data and then instruct the orchestrator 202 to seek out that missing data form another source (e.g. external source, a storage container 204, etc.).

In some embodiments, the automated machine learning container 502 may start from, or be instantiated with, a generalized set of models to evaluate, appropriate for any data set. In other embodiments, automated machine learning containers 502 may be stored (e.g. as inert containers 126, etc.) and instantiated with sets of industry, data-type, or operation-specific models. S FIG. 8 is a schematic view of a non-limiting example of a machine learning model container 504. As previously discussed, a machine learning model container 504 is a container that is configured to receive a data object (e.g. cleansed data object 606, etc.) and a target metric 700, and provide a predicted value 703 for the target metric 700 based upon the application of a machine learning model 702 to the data object 606. The complexity of such a container may range from simple linear relationships to implementing a full neural network. In some embodiments, the machine learning model container 504 may receive on-line training through the API Gateway 200. As an option, some ML model containers 504 may implement iterative model generation, allowing for the improvement and/or (if needed) rollback of versioned models. In some embodiments, a model 702 may be trained manually, or may evolve programmatically using simulation and prediction methods including, but not limited to, genetic algorithms and simulated annealing.

FIG. 9 is a schematic view of a non-limiting example of a blockchain peer container 506. As shown, a blockchain peer container 506 comprises two different storage elements, an immutable leger 902 of historical blockchain transaction and operations, and a world state 900 indicating the present state of the information being shared within a blockchain network 904. In some embodiments, one or both of these storage elements may be implemented in the form of a database, as is known in the art.

Additionally, in some embodiments, the blockchain peer container 506 may implement one or more smart contracts 910. In the context of the present description, a smart contract 910, or chaincode, is a series of logic operations or steps that represent an operation being executed on behalf of an entity (e.g. user, organization, etc.). Smart contracts 910 identify what information is needed, where it needs to come from, what peers need to authenticate the operation or "sign" and/or how many peers need to sign, the criteria for rendering a response, and any other evaluation or function that may be involved in automating a particular operation, evaluation, or transaction. In some implementations of a blockchain network 904, nothing is added to the blockchain without going through a smart contract 910 first.

According to various embodiments, smart contracts 910 may be implemented as scripts, using languages such as Go or JavaScript, or the like. In some embodiments, smart contracts 910 may be defined along with a policy, or a reduced set of requirements that can be passed along to other peers, such that they are aware of the required information, but are not privy to the logic being employed to render a result.

The blockchain peer container 506 allows an adaptive computer cluster 104 to interact with a blockchain network 904. Such interactions may include, but are not limited to, retrieving a data object 906 associated with the blockchain network 904 (e.g. historical information from the ledger 902, current information from the world state 900, etc.), submitting a proposed transaction 908 to the blockchain network 904 (e.g. interacting with a smart contract 910 associated with another peer, executing a smart contract 910 in response to a request 912 received from another peer, etc.), updating the ledger 902 and world state 900 to be consistent with the rest of the network 904, and the like.

Blockchain networks provide a number of unique advantages over conventional methods of interacting with other parties. The use of a shared, immutable ledger 902 that shows all transactions allows parties to interact even if they do not trust each other. The ledger 902 keeps everyone honest.

In the context of the present description and the claims that follow, a blockchain network 904 is a collection of peers that are able to interact with each other and share a common world state 900, said interactions being recorded in a shared immutable ledger 902. In some embodiments, the peers of the blockchain network 904 may be distributed among two or more discrete devices connected through a network, like the Internet. In other embodiments, an entire blockchain network 904 may be implemented within a single adaptive computer cluster 104, with multiple instances of blockchain peer containers 506 communicating with each other, either directly or through the orchestrator 202. Such a configuration may be advantageous; each peer container 506 may be associated with a different entity, having its own set of smart contracts 910 and direct routing to other containers and external resources associated with said entity. Such a cluster 104 could be used to facilitate the cooperation of multiple entities towards a shared endeavor, even if the entities do not trust each other or are competitors.

As a specific example, the configuration tool 128 may be used to define one or more procedures 120 for the purpose of obtaining prior authorization for providing a medical procedure to a patient. Based upon these procedures 120, the configuration tool 128 would generate a set of instructions 130 sent from the cluster configuration server 102 to a cluster hosting environment 106, such as a cloud-based environment 116, where an adaptive computer cluster 104 would be instantiated. This cluster 104 may include blockchain peer containers 506 for each healthcare provider, insurance provider, pharmacy, and other entity that may be involved in the medical procedure (or array of anticipated medical procedures needing prior authorization), as well as one or more blockchain peer containers 506 to serve as ordering peers (e.g. a peer that places various transactions in proper order, facilitates execution of smart contracts requiring multiple signatures, updates the ledger 902 and world state 900, propagates updated world state 900 and ledgers 902 to the rest of the network 904, etc.). Each peer container 506, through the use of smart contracts 910, can request information from other entities. This information, most likely stored in a proprietary system maintained by an entity and out of reach of any other entities, may be access using input containers 216 configured to interact with each proprietary system.

A healthcare provider may submit a request through the API gateway 200, which authenticates them as having access to the cluster 104 and passes the request on to the orchestrator 202. The orchestrator 202 recognizes the request as a trigger event 122 for the "prior authorization" procedure 120, and executes the associated tasks 124 by assigning them to appropriate blockchain peer containers 506, which may carry out the tasks by executing smart contracts 910. The end result, a determination whether the medical procedure is authorized or not, may be reported directly to the provider, or the healthcare provider may access that determination through the blockchain network as part of the world state 900 or ledger 902. The adaptive nature of the cluster 104, and its implementation using containers, allows for the cluster 104 to expand with the introduction of additional entities (e.g. additional hospitals, doctors, insurers, pharmacies, etc.) without requiring drastic changes or loosing any efficiency.

In some embodiments, an entire blockchain network 904 may be implemented within a single adaptive computer cluster 104, while in others a cluster 104 may participate in a blockchain network 904 external to the cluster 104 through one or more blockchain peer containers 506. Some embodiments may use one or more input containers 216, functioning as data aggregators, to bridge multiple blockchain networks by translating between the various data formats being used.

In some embodiments, the rest of the cluster 104 may see a blockchain peer container 506 as simply another type of storage container or input container, able to receive and provide data that is part of the world state 900 of a blockchain network 904. In some embodiments, interactions between a blockchain peer container 506 and peers external to the cluster 104 may be made directly, while in others said interactions might have to go through the API gateway 200.

Figure 10:
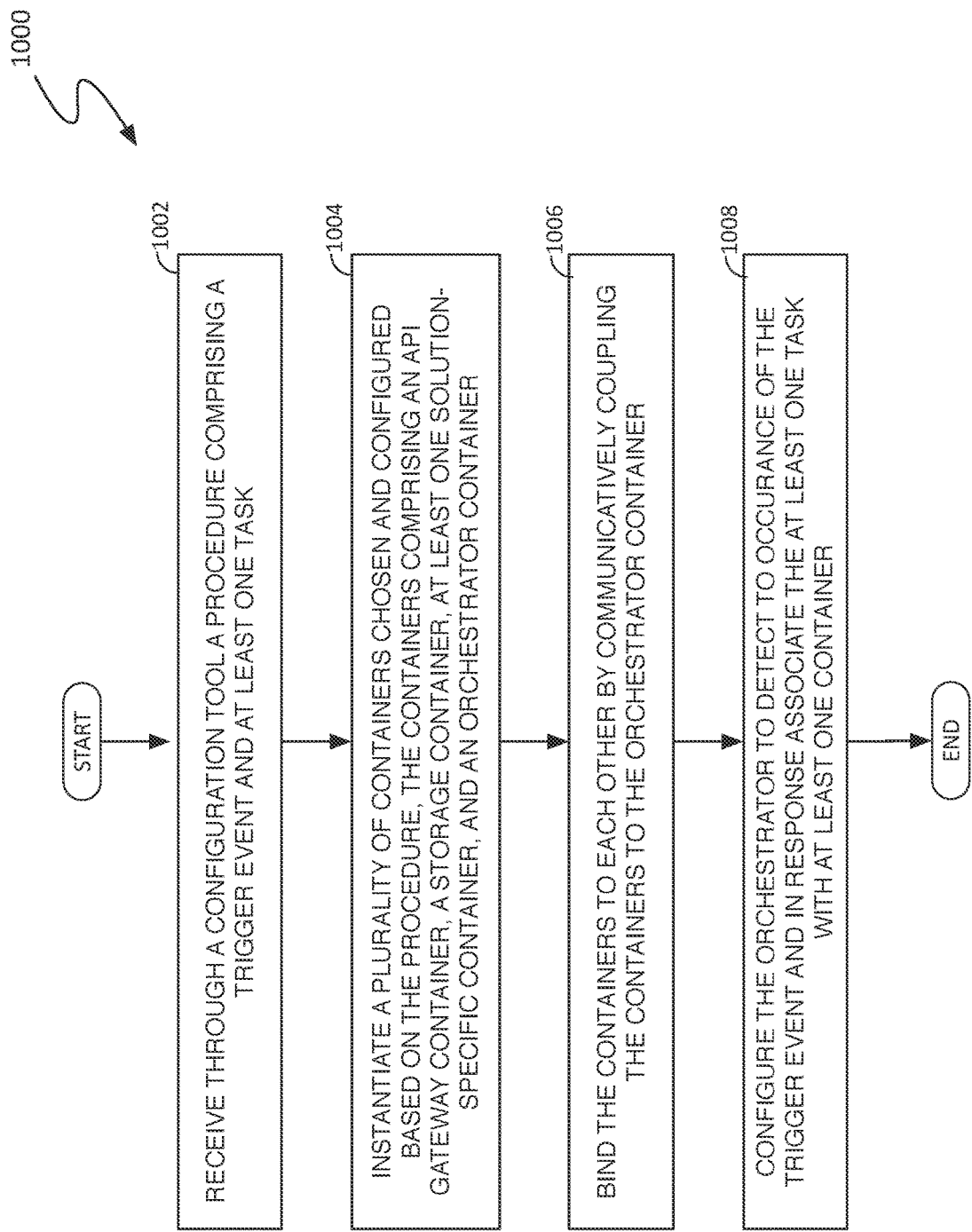
FIG. 10 is a process flow for configuring an adaptive computer cluster.

FIG. 10 is a process flow for a non-limiting example of a method 1000 for configuring an adaptive computer cluster. The method comprises receiving, through a configuration tool 128, at least one procedure 128 comprising a trigger event 122 and at least one task 124. See step 1002. In some embodiments, the configuration tool 128 may automatically select the appropriate containers and architecture for a cluster 104 based upon the specified procedures 120, while in other embodiments the configuration tool 128 may also receive a specified structure and makeup for the adaptive computer cluster 104.

Once the configuration tool 128 has the structure of the cluster 104, whether derived from procedure(s) 120 or received directly, the adaptive computer cluster 104 is instantiated. The method comprises instantiating, within a cluster hosting environment 106, a plurality of containers chosen from a plurality of inert containers 126 and configured based upon the at least one procedure 120. See step 1004. According to various embodiments, the configuration tool 128 may start from a baseline set of containers, which may include an API gateway container 200, a storage container 204, and an orchestrator container 202, and may further include one or more solution-specific containers 212, including but not limited to those containers shown in FIG. 5. In some embodiments, the baseline set of containers may also include a distributed computing master node 208.

The containers that make up the cluster 104 are then connected in an appropriate manner The method comprises binding the plurality of containers to each other. See step 1006. According to various embodiments, all of the containers may be communicatively coupled to each other through the orchestrator container, and may further be coupled directly to each other if warranted by the specified procedure(s) 120.

Finally, the adaptive computer cluster 104 is configured to perform its intended functions. The method comprises configuring the event detection unit 400 of the orchestrator container 202 to detect the occurrence of the trigger event 122 and the job assembly unit 402 of the orchestrator 202 to associate each of the at least one task 124 with at least one of the containers within the adaptive computer cluster 104. See step 1008.

In some embodiments, the configuration tool 128 may be used to configure a new adaptive computer cluster 104, as well as reconfigure an existing adaptive computer cluster 104 (e.g. modify the set of instructions 130 used to instantiate and configure the cluster 104, etc.). In other embodiments, an instantiated cluster 104 may be modified (e.g. given new procedures 120, expanded in capacity, etc.) by communicating with the orchestrator container 202 after being authenticated by the API gateway container 200. Some clusters 104 may be modified while running, while others may simply be reinstantiated with a new set of instructions 130.

Figure 11:
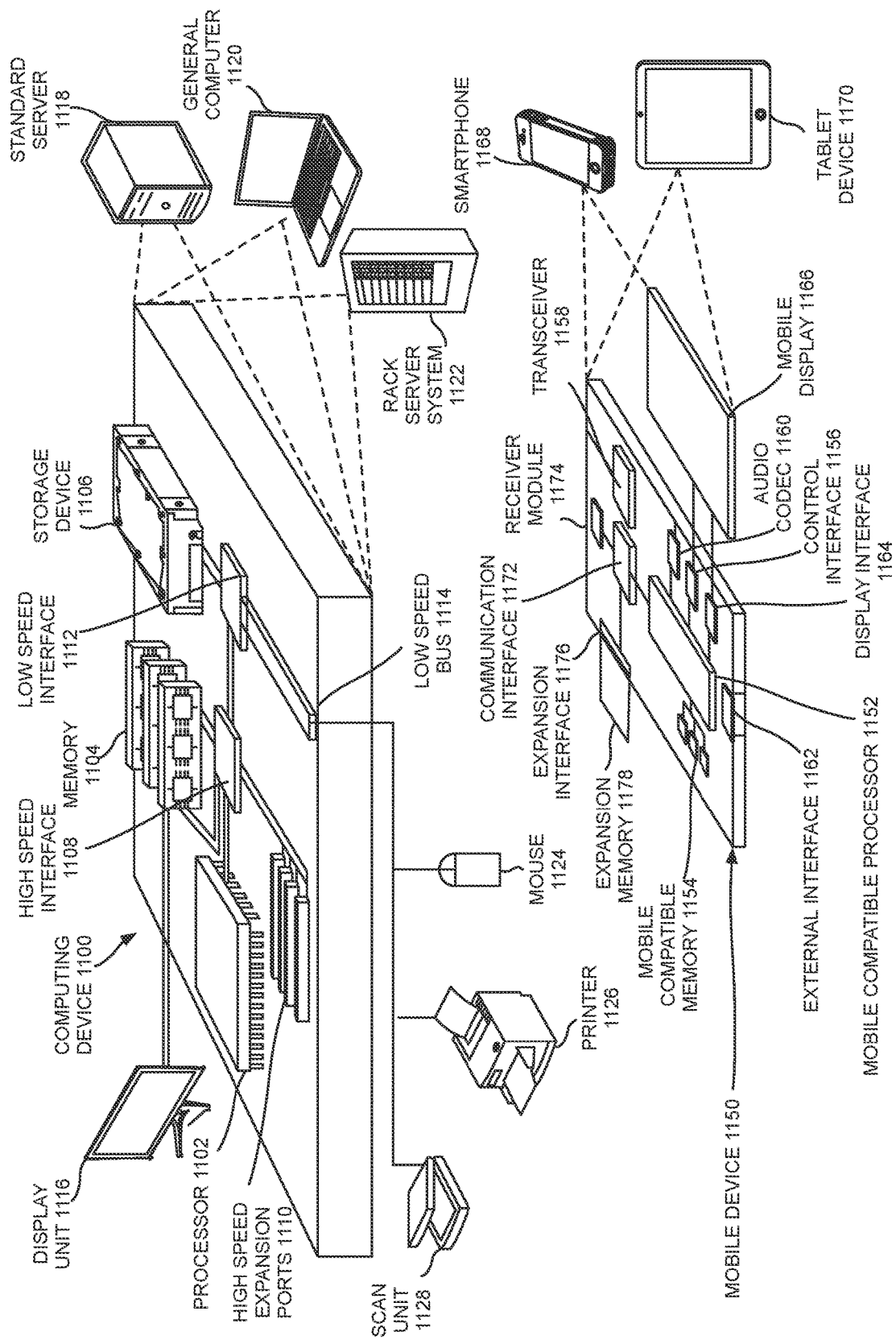
FIG. 11 is a schematic diagram of a specific computing device that can be used to implement the methods and systems disclosed herein, according to one or more embodiments.

FIG. 11 is a schematic diagram of specific computing device 1100 and a specific mobile computing device 1130 that can be used to perform and/or implement any of the embodiments disclosed herein. In one or more embodiments, the cluster configuration server 102 and/or the cluster hosting environment 106 of FIG. 1 may be the specific computing device 1100. Additionally, the client device 222 of FIG. 2 may be the specific computing device 1100 or the mobile device 1150, according to various embodiments.

The specific computing device 1100 may represent various forms of digital computers, such as laptops, desktops, workstations, personal digital assistants, servers, blade servers, mainframes, and/or other appropriate computers. The specific mobile computing device 1130 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 1100 may include a processor 1103, a memory 1105, a storage device 1106, a high speed interface 1108 coupled to the memory 1105 and a plurality of high speed expansion ports 1110, and a low speed interface 1112 coupled to a low speed bus 1114 and a storage device 1106. In one embodiment, each of the components heretofore may be inter-coupled using various buses, and may be mounted on a common motherboard and/or in other manners as appropriate. The processor 1103 may process instructions for execution in the specific computing device 1100, including instructions stored in the memory 1105 and/or on the storage device 1106 to display a graphical information for a GUI on an external input/output device, such as a display unit 1116 coupled to the high speed interface 1108, according to one embodiment.

In other embodiments, multiple processors and/or multiple buses may be used, as appropriate, along with multiple memories and/or types of memory. Also, a plurality of specific computing device 1100 may be coupled with, with each device providing portions of the necessary operations (e.g., as a server bank, a group of blade servers, and/or a multi-processor system).

The memory 1105 may be coupled to the specific computing device 1100. In one embodiment, the memory 1105 may be a volatile memory. In another embodiment, the memory 1105 may be a non-volatile memory. The memory 1105 may also be another form of computer-readable medium, such as a magnetic and/or an optical disk. The storage device 1106 may be capable of providing mass storage for the specific computing device 1100. In one embodiment, the storage device 1106 may be includes a floppy disk device, a hard disk device, an optical disk device, a tape device, a flash memory and/or other similar solid state memory device. In another embodiment, the storage device 1106 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 1105, the storage device 1106, a memory coupled to the processor 1103, and/or a propagated signal.

The high speed interface 1108 may manage bandwidth-intensive operations for the specific computing device 1100, while the low speed interface 1112 may manage lower bandwidth-intensive operations. Such allocation of functions is exemplary only. In one embodiment, the high speed interface 1108 may be coupled to the memory 1105, the display unit 1116 (e.g., through a graphics processor and/or an accelerator), and to the plurality of high speed expansion ports 1110, which may accept various expansion cards.

In the embodiment, the low speed interface 1112 may be coupled to the storage device 1106 and the low speed bus 1114. The low speed bus 1114 may be comprised of a wired and/or wireless communication port (e.g., a Universal Serial Bus ("USB"), a Bluetooth® port, an Ethernet port, and/or a wireless Ethernet port). The low speed bus 1114 may also be coupled to the scan unit 1128, a printer 1126, a keyboard, a mouse 1124, and a networking device (e.g., a switch and/or a router) through a network adapter.

The specific computing device 1100 may be implemented in a number of different forms, as shown in the figure. In one embodiment, the specific computing device 1100 may be implemented as a standard server 1118 and/or a group of such servers. In another embodiment, the specific computing device 1100 may be implemented as part of a rack server system 1122. In yet another embodiment, the specific computing device 1100 may be implemented as a general computer 1120 such as a laptop or desktop computer. Alternatively, a component from the specific computing device 1100 may be combined with another component in a specific mobile computing device 1130. In one or more embodiments, an entire system may be made up of a plurality of specific computing device 1100 and/or a plurality of specific computing device 1100 coupled to a plurality of specific mobile computing device 1130.

In one embodiment, the specific mobile computing device 1130 may include a mobile compatible processor 1132, a mobile compatible memory 1134, and an input/output device such as a mobile display 1146, a communication interface 1152, and a transceiver 1138, among other components. The specific mobile computing device 1130 may also be provided with a storage device, such as a microdrive or other device, to provide additional storage. In one embodiment, the components indicated heretofore are inter-coupled using various buses, and several of the components may be mounted on a common motherboard.

The mobile compatible processor 1132 may execute instructions in the specific mobile computing device 1130, including instructions stored in the mobile compatible memory 1134. The mobile compatible processor 1132 may be implemented as a chipset of chips that include separate and multiple analog and digital processors. The mobile compatible processor 1132 may provide, for example, for coordination of the other components of the specific mobile computing device 1130, such as control of user interfaces, applications run by the specific mobile computing device 1130, and wireless communication by the specific mobile computing device 1130.

The mobile compatible processor 1132 may communicate with a user through the control interface 1136 and the display interface 1144 coupled to a mobile display 1146. In one embodiment, the mobile display 1146 may be a Thin-Film-Transistor Liquid Crystal Display ("TFT LCD"), an Organic Light Emitting Diode ("OLED") display, and another appropriate display technology. The display interface 1144 may comprise appropriate circuitry for driving the mobile display 1146 to present graphical and other information to a user. The control interface 1136 may receive commands from a user and convert them for submission to the mobile compatible processor 1132.

In addition, an external interface 1142 may be provide in communication with the mobile compatible processor 1132, so as to enable near area communication of the specific mobile computing device 1130 with other devices. External interface 1142 may provide, for example, for wired communication in some embodiments, or for wireless communication in other embodiments, and multiple interfaces may also be used.

The mobile compatible memory 1134 may be coupled to the specific mobile computing device 1130. The mobile compatible memory 1134 may be implemented as a volatile memory and a non-volatile memory. The expansion memory 1158 may also be coupled to the specific mobile computing device 1130 through the expansion interface 1156, which may comprise, for example, a Single In Line Memory Module ("SIMM") card interface. The expansion memory 1158 may provide extra storage space for the specific mobile computing device 1130, or may also store an application or other information for the specific mobile computing device 1130.

Specifically, the expansion memory 1158 may comprise instructions to carry out the processes described above. The expansion memory 1158 may also comprise secure information. For example, the expansion memory 1158 may be provided as a security module for the specific mobile computing device 1130, and may be programmed with instructions that permit secure use of the specific mobile computing device 1130. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 1134, the expansion memory 1158, a memory coupled to the mobile compatible processor 1132, and a propagated signal that may be received, for example, over the transceiver 1138 and/or the external interface 1142.

The specific mobile computing device 1130 may communicate wirelessly through the communication interface 1152, which may be comprised of a digital signal processing circuitry. The communication interface 1152 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 1138 (e.g., radio-frequency transceiver). In addition, short-range communication may occur, such as using a Bluetooth®, Wi-Fi, and/or other such transceiver. In addition, a GPS ("Global Positioning System") receiver module 1154 may provide additional navigation-related and location-related wireless data to the specific mobile computing device 1130, which may be used as appropriate by a software application running on the specific mobile computing device 1130.

The specific mobile computing device 1130 may also communicate audibly using an audio codec 1140, which may receive spoken information from a user and convert it to usable digital information. The audio codec 1140 may likewise generate audible sound for a user, such as through a speaker (e.g., in a handset smartphone of the specific mobile computing device 1130). Such a sound may comprise a sound from a voice telephone call, a recorded sound (e.g., a voice message, a music files, etc.) and may also include a sound generated by an application operating on the specific mobile computing device 1130.

The specific mobile computing device 1130 may be implemented in a number of different forms, as shown in the figure. In one embodiment, the specific mobile computing device 1130 may be implemented as a smartphone 1148. In another embodiment, the specific mobile computing device 1130 may be implemented as a personal digital assistant ("PDA"). In yet another embodiment, the specific mobile computing device, 1130 may be implemented as a tablet device 1150.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other containers and cluster hosting environments could be intermixed or substituted with those provided. In places where the description above refers to particular embodiments of adaptive computer clusters, cluster configuration servers, and configuration methods and tools, it should be readily apparent that a number of modifications may be made without departing from the spirit thereof and that these embodiments and implementations may be applied to other cluster technologies as well. Accordingly, the disclosed subject matter is intended to embrace all such alterations, modifications and variations that fall within the spirit and scope of the disclosure and the knowledge of one of ordinary skill in the art.

What is claimed is:

1. A system for configuring an adaptive computer cluster, comprising:
    a cluster hosting environment; and
    a cluster configuration server communicatively coupled to the cluster hosting environment through a network, the cluster configuration server having a processor and a memory, the memory comprising a configuration tool configured to receive a procedure comprising a trigger event and a task and further configured to instruct the cluster hosting environment to instantiate the adaptive computer cluster based upon the procedure, the instantiation instructions comprising instructions to instantiate, within the cluster hosting environment:
        an API gateway container comprising an authentication unit and a logging unit, the API gateway container communicatively coupled to at least one of a data source and a client device through the network;
        a storage container comprising a database;
        a solution-specific container selected based upon the procedure received by the configuration tool, wherein the solution-specific container comprises a blockchain peer container comprising a world state database and a transactional ledger, and wherein the solution-specific container is communicatively coupled to a blockchain network; and
        an orchestrator container comprising an event detection unit, a job assembly unit, and a job scheduling unit, wherein the job assembly unit is configured to create event-specific jobs based on information received directly through the API gateway container from the at least one of a data source and a client device without human intervention;
    wherein the blockchain peer container is configured to retrieve a data object from one of the transactional ledger and the world state database in response to a task assigned by the job scheduling unit of the orchestrator container, and further configured to submit a proposed transaction to the blockchain network, and
    wherein the instructions from the configuration tool further comprise instructions to communicatively couple the API gateway container, the storage container, and the solution-specific container to the orchestrator container.

2. The system of claim 1, further comprising:
    a distributed computing master node container configured to instantiate and control at least one slave node container, as needed;
    wherein the instructions from the configuration tool further comprise instructions to communicatively couple the distributed computing master node container to the API gateway container and the storage container.

3. The system of claim 1, further comprising a second solution-specific container, the second solution-specific container comprising an automated data cleansing container configured to receive a data object associated with the procedure, prepare the data object for an operation associated with the procedure by identifying missing data and generating replacement data, and output a cleansed data object.

4. The system of claim 3, wherein the automated data cleansing container is further configured to generate a report describing at least one statistical property of the data object.

5. The system of claim 1, further comprising a second solution-specific container, the second solution-specific container comprising an automated machine learning container configured to receive a data object associated with the procedure and a target metric associated with the procedure, automatically generate a plurality of machine learning models based upon the data object to predict the target metric, rank the plurality of machine learning models based upon ability to predict the target metric, and instantiate a machine learning model container based upon one of the plurality of generated machine learning models, the machine learning model container communicatively coupled to the orchestrator container.

6. The system of claim 5, wherein the adaptive computing cluster is further configured such that the automated machine learning container receives the data object directly from a data cleansing container.

7. The system of claim 5, wherein the automated machine learning container is further configured to generate a report indicating the rank of each of the plurality of machine learning models and at least one parameter associated with the generation of each of the plurality of machine learning models, receive at least one modified parameter, and regenerate at least one machine learning model based upon the at least one modified parameter.

8. The system of claim 1, wherein the solution-specific container comprises a machine learning model container comprising a machine learning model and configured to receive a data object associated with the procedure and a target metric associated with the procedure, and generate a predicted value for the target metric by applying the machine learning model to the data object.

9. The system of claim 1, wherein the blockchain peer container comprises a smart contract associated with the procedure and configured to automatically execute the smart contract in response to a request received from the blockchain network.

10. A method for configuring an adaptive computer cluster, comprising:
    receiving a procedure comprising a trigger event and a task;
    instantiating, within a cluster hosting environment, a plurality of containers configured based upon the procedure, the plurality of containers comprising:
        an API gateway container comprising an authentication unit and a logging unit, the API gateway container communicatively coupled to at least one of a data source and a client device through a network;
        a storage container comprising a database;
        a solution-specific container selected based upon the procedure, wherein the solution-specific container comprises an automated data cleansing container configured to receive a data object associated with the procedure and output a cleansed data object; and
        an orchestrator container comprising an event detection unit, a job assembly unit, and a job scheduling unit, wherein the job assembly unit is configured to create event-specific jobs based on information received directly through the API gateway container from the at least one of a data source and a client device without human intervention;

binding the plurality of containers to each other by communicatively coupling the API gateway container, the storage container, and the solution-specific container to the orchestrator container; and configuring the event detection unit to detect the occurrence of the trigger event and configuring the job assembly unit to directly associate the task with at least one of the plurality of containers without human intervention.

11. The method of claim 10, wherein the cluster hosting environment is a cloud-based environment.

12. The method of claim 10, wherein the automated data cleansing container is further configured to generate a report describing at least one statistical property of the data object.

13. The method of claim 10, further comprising a second solution-specific container, the second solution-specific container comprising an automated machine learning container configured to receive a data object associated with procedure and a target metric associated with the procedure, automatically generate a plurality of machine learning models based upon the data object to predict the target metric, rank the plurality of machine learning models based upon ability to predict the target metric, and instantiate a machine learning model container based upon one of the plurality of generated machine learning models, the machine learning model container communicatively coupled to the orchestrator container.

14. The method of claim 13, wherein the adaptive computing cluster is further configured such that the automated machine learning container receives the data object directly from a data cleansing container.

15. The method of claim 13, wherein the automated machine learning container is further configured to generate a report indicating the rank of each of the plurality of machine learning models and at least one parameter associated with the generation of each of the plurality of machine learning models, receive at least one modified parameter, and regenerate at least one machine learning model based upon the at least one modified parameter.

16. The method of claim 10, wherein the solution-specific container comprises a machine learning model container comprising a machine learning model and configured to receive a data object associated with the procedure and a target metric associated with the procedure, and generate a predicted value for the target metric by applying the machine learning model to the data object.

17. A system for configuring an adaptive computer cluster, the system comprising:

a cluster hosting environment; and a cluster configuration server communicatively coupled to the cluster hosting environment through a network, the cluster configuration server having a processor and a memory, the memory comprising a configuration tool configured to receive a procedure comprising a trigger event and a task and further configured to instruct the cluster hosting environment to instantiate the adaptive computer cluster based upon the procedure, the instantiation instructions comprising instructions to instantiate, within the cluster hosting environment:

an API gateway container comprising an authentication unit and a logging unit, the API gateway container communicatively coupled to at least one of a data source and a client device through the network;

a storage container comprising a database;

a solution-specific container selected based upon the procedure received by the configuration tool, wherein the solution-specific container comprises an automated machine learning container configured to receive a data object associated with the procedure and a target metric associated with the procedure; and an orchestrator container;

wherein the automated machine learning container automatically generates a plurality of machine learning models based upon the data object to predict the target metric, ranks the plurality of machine learning models based upon the ability to predict the target metric, and instantiates a machine learning model container based upon one of the plurality of generated machine learning models, and wherein the instructions from the configuration tool further comprise instructions to communicatively couple the API gateway container, the storage container, and the solution-specific container to the orchestrator container.

18. The system of claim 17, wherein the adaptive computing cluster is further configured such that the automated machine learning container receives the data object directly from a data cleansing container.

19. The system of claim 18, wherein the automated machine learning container is further configured to generate a report indicating the rank of each of the plurality of machine learning models and at least one parameter associated with the generation of each of the plurality of machine learning models, receive at least one modified parameter, and regenerate at least one machine learning model based upon the at least one modified parameter.

20. The system of claim 18, further comprising a second solution-specific container comprising a blockchain peer container comprising a world state database and a transactional ledger, wherein the blockchain peer container is communicatively coupled to a blockchain network, and wherein the blockchain peer container comprises a smart contract associated with the procedure and is configured to automatically execute the smart contract in response to a request received from the blockchain network.

* * * * *